United States Patent [19]

Cordier

[11] Patent Number: 4,776,018
[45] Date of Patent: Oct. 4, 1988

[54] REMOVABLE SOUND OR/AND DISPLAY APPARATUS

[76] Inventor: Laurent Cordier, 70, rue de Vesle, F-51100 Reims, France

[21] Appl. No.: 865,563

[22] PCT Filed: Aug. 27, 1985

[86] PCT No.: PCT/FR85/00229
§ 371 Date: Apr. 24, 1986
§ 102(e) Date: Apr. 24, 1986

[87] PCT Pub. No.: WO86/01669
PCT Pub. Date: Mar. 13, 1986

[30] Foreign Application Priority Data

Aug. 29, 1984 [FR] France .............................. 8413560

[51] Int. Cl.⁴ .................................................. H04R 1/02
[52] U.S. Cl. .......................................... 381/88; 381/90; 381/205

[58] Field of Search ................. 381/188, 205, 88, 190; 455/346

[56] References Cited

U.S. PATENT DOCUMENTS

| | | | |
|---|---|---|---|
| 2,924,661 | 2/1960 | Messeas | 381/188 |
| 3,911,221 | 10/1975 | Wong | 381/188 |
| 4,061,971 | 12/1977 | Barrons | 455/346 |
| 4,434,509 | 2/1984 | Schrepel | 455/351 |
| 4,528,620 | 7/1985 | Weber | 362/253 |

Primary Examiner—Forester W. Isen
Attorney, Agent, or Firm—Lerner, David, Littenberg, Krumholz & Mentlik

[57] ABSTRACT

This apparatus is fixed and connected by the same means (2) and it is housed in the space usually reserved for a light bulb or a cigar lighter; it is switched on and adjusted by means of collars (6, 7 and 8) or buttons situated on the body (1) next to the loudspeaker (5) or/and the display screen.

8 Claims, 2 Drawing Sheets

FIG. I

REMOVABLE SOUND OR/AND DISPLAY APPARATUS

The invention relates to a removable sound or/and display apparatus.

It is known to wire shops and public places for sound by means of loudspeakers disposed at certain places and broadcasting the same music and the same messages at the same time by means of rather complex and centralized installations, necessitating cumbersome and unsightly cables.

It is also known, to illuminate locally certain parts of premises by means of floodlights or spotlights fixed to tracks allowing a certain latitude in positioning. These means of lighting consist of a lamp, fixed and supplied by electrical current by means of a screw or bayonet fitting, integral with an articulated sliding device mounted on a fixed track fixed to the ceiling or against the walls. This lamp is generally mounted in a housing which reduces the dispersion of the light rays and concentrates them on a precise point.

It is also known to mount, in place of the cigar lighter of a vehicle, a special socket which may be fitted with clips permitting the supply of electrical current to a lamp or an apparatus.

The object of the invention is to utilize the same means of fixing and supply for sound and possibly visual display as for lighting or for the supply of electricity to apparatuses; that is, by utilizing the infrastructure of the localized lighting, as described in the preceding paragraph, or the cigar lighter of a vehicle, and to individualize the sound or/and the display, according to the place, by means of a removable apparatus specially designed for this use and this mode of fixing and supply.

The main features of the sound or/and display apparatus according to the invention are that it is fixed and connected to the mains supplies by means of a single device, that it is housed in the space usually reserved for a light bulb or the cigar lighter of a vehicle and that it is switched on and adjusted by means of collars or buttons situated on the body of the apparatus.

The device which makes it possible to simultaneously ensure fixing and connection to the mains supplies consists of a screw or bayonet system analogous or identical to that usually used to fix and supply electricity to light bulbs, or of a system with crocodile clips analogous or identical to that used on the cigar lighter of vehicles.

The loudspeaker or/and the display screen are mounted on the end opposite the device for fixing and connection.

In a particular embodiment, the loudspeaker, the enclosure or/and the display screen are separate from the apparatus and connected to it by wires and sockets.

The power-on and adjusting collars or buttons are situated just above the loudspeaker in the case of an apparatus designed solely for sound, and on the front part of it when it is designed both for sound and for visual display.

Its receiving frequency may be regulated to the transmission frequency of a central transmitter situated in the same premises or the same establishment for purposes of broadcasting of music and of messages.

It may be combined with a lamp which may be switched on at will, independently of the apparatus.

This apparatus is entirely sealed.

Thus, as may be seen, this apparatus will, in its most general use, be able to be mounted at will in a floodlight or spotlight, in order to constitute a particular sound end lighting device with the other floodlights or spotlights reserved soley for lighting, situated close by on the same supporting track or on neighbouring tracks, or, in a more particular use, it may be mounted in place of the cigar lighter of a vehicle.

Other features and advantages will appear in the following description of a sound installation according to the invention provided by way of example with regard to the appended drawing representing the apparatus replacing a light bulb in a spotlight fixed on a track.

Figure 1:
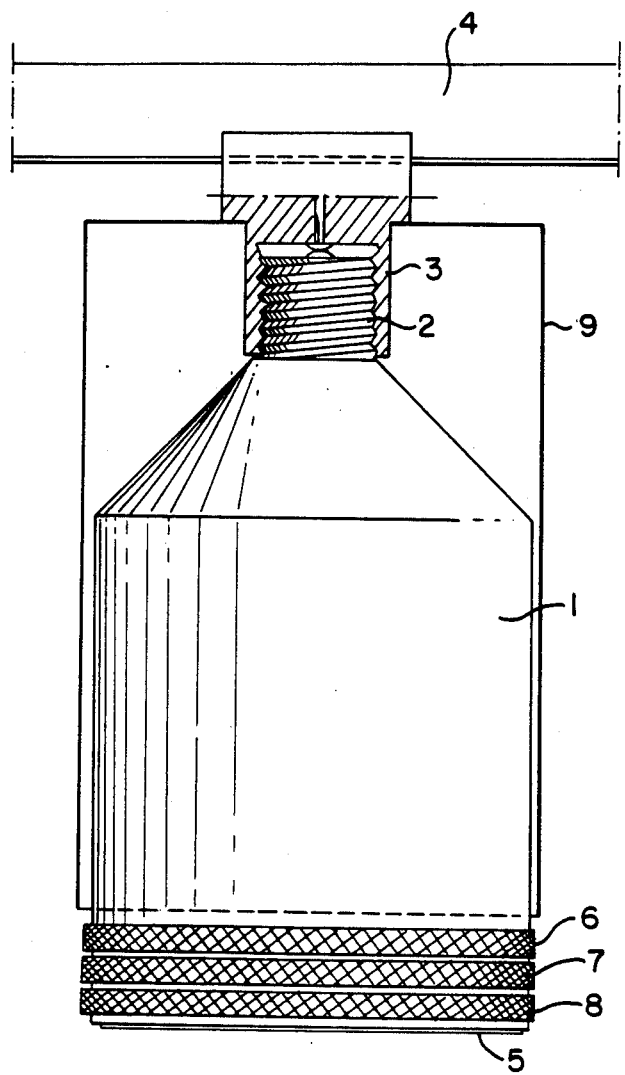
FIG. 1 shows a preferred embodiment of the invention.
Figure 2:
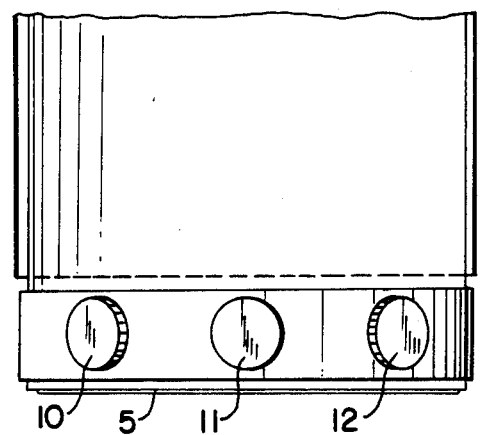
FIG. 2 is a side, perspective, drawing of another embodiment of the invention.

By examining the figure it will be noted in the example represented, corresponding to a radio set, the apparatus consists of a body 1, forming a housing, including, at one of its ends, a screw-type lamp base 2 fitted with contacts permitting connection to the mains, by means of a standard screw-type fitting 3 mounted on a track 4 and, at the other end, a loudspeaker 5 or a display screen. The selection of wavelengths, the selection of frequency, the switching on and the adjustment of the volume of the sound are carried out respectively by means of the rotating collars 6, 7 and 8 or by means of buttons as shown in FIG. 2, in which 10, 11, and 12 depict buttons for the various mentioned control functions. The apparatus may be mounted in place of a light bulb notably inside the housing 9 of a floodlight or spotlight, since its shape and its dimensions have been determined accordingly.

Figure 3:
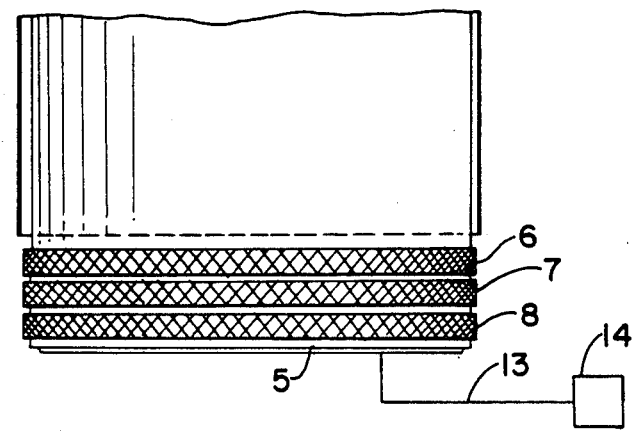
FIG. 3 is a side, perspective, partially schematic drawing of yet another embodiment of the present invention.

FIG. 3 shows an embodiment in which a loudspeaker 14 is separate from the unit itself, and is connected thereto by wires 13.

There is no reason why the loudspeaker should not be completed by a display screen, on condition that the latter complies with certain particular characteristics.

This apparatus may be designed to operate autonomously, receiving, by means of the connection device, only the electrical current necessary for its operation, replacing an electric light bulb, or to convert into images and sound signals transmitted by the electricity supply cable or by separate conductors connected to an autonomous central transmitter.

The fixing and supply device consists, in a preferred embodiment, of a screw or bayonet system used to supply lighting lamps or of the crocodile clip system used on vehicle cigar lighters, but other devices enabling the apparatus to receive both the electrical energy and the signals necessary for its operation may be envisaged, the screw, bayonet or clip fixing system being retained nonetheless as a means of connection.

This apparatus has the particular feature of being able to be mounted in any socket whatever, in place of a lamp, or in place of a cigar lighter, in order to be used for broadcasting music and messages in shops, public places, and vehicles or any other place requiring wiring for sound, without resorting to a complex and costly installation.

What is claimed is:

1. A removable sound apparatus for replacement of a light bulb normally held in a light bulb housing by socket means, said removable sound apparatus comprising a casing for said sound apparatus, said casing being adapted to be housed within said light bulb housing, and electrical connection means for said removable sound apparatus projecting from said casing, said electrical connection means being adapted for electrical connection to said socket means, whereby said removable sound apparatus can replace said light bulb normally held by said socket means.

2. The removable sound apparatus to claim 1 wherein said electrical connection means is selected from the group consisting of screw and bayonet type fixtures.

3. The removable sound apparatus of claim 1 including a control mechanism for said removable sound apparatus mounted on said casing opposite from said electrical connection means whereby said control mechanism is exposed with respect to said light bulb housing when said casing is housed within said light bulb housing.

4. The removable sound apparatus of claim 3 wherein said control mechanism includes a plurality of circular rotatable collars.

5. The removable sound apparatus of claim 3 wherein said control mechanism comprises button members.

6. The removable sound apparatus of claim 1 including a loudspeaker mounted on said casing opposite from said electrical connection means whereby said loudspeaker is exposed with respect to said light bulb housing when said casing is housed within said light bulb housing.

7. The removable sound apparatus of claim 6 wherein said loudspeaker is separate from said sound apparatus and wherein said loudspeaker is connected to said sound apparatus by electrical connection means.

8. The removable sound apparatus of claim 1 wherein said casing is entirely sealed.

* * * * *